March 30, 1965 B. ROUBAN 3,175,632
WEIGHING SYSTEM
Filed Jan. 14, 1963 5 Sheets-Sheet 2
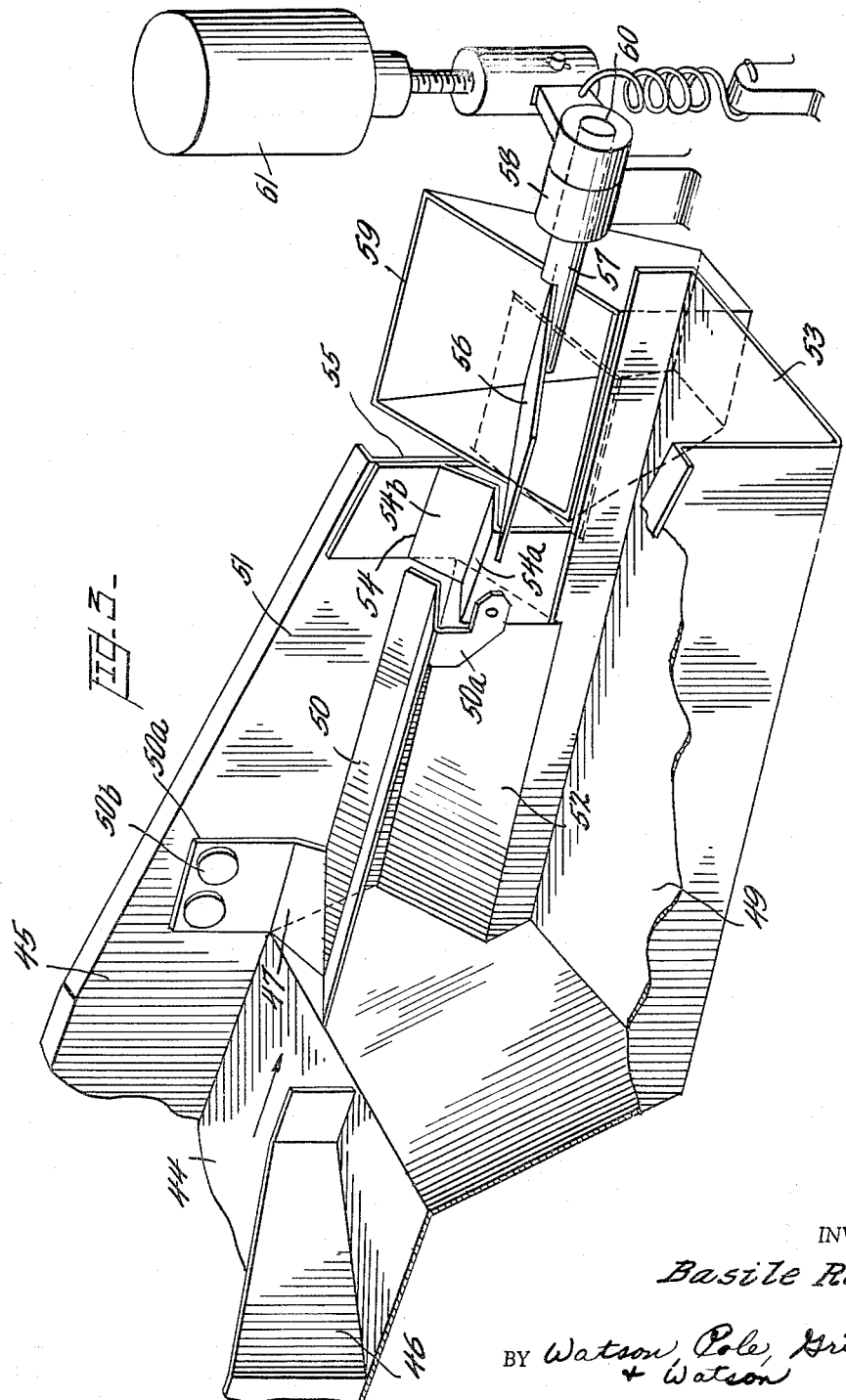
INVENTOR
Basile Rouban,
BY Watson, Cole, Grindle,
& Watson
ATTORNEYS

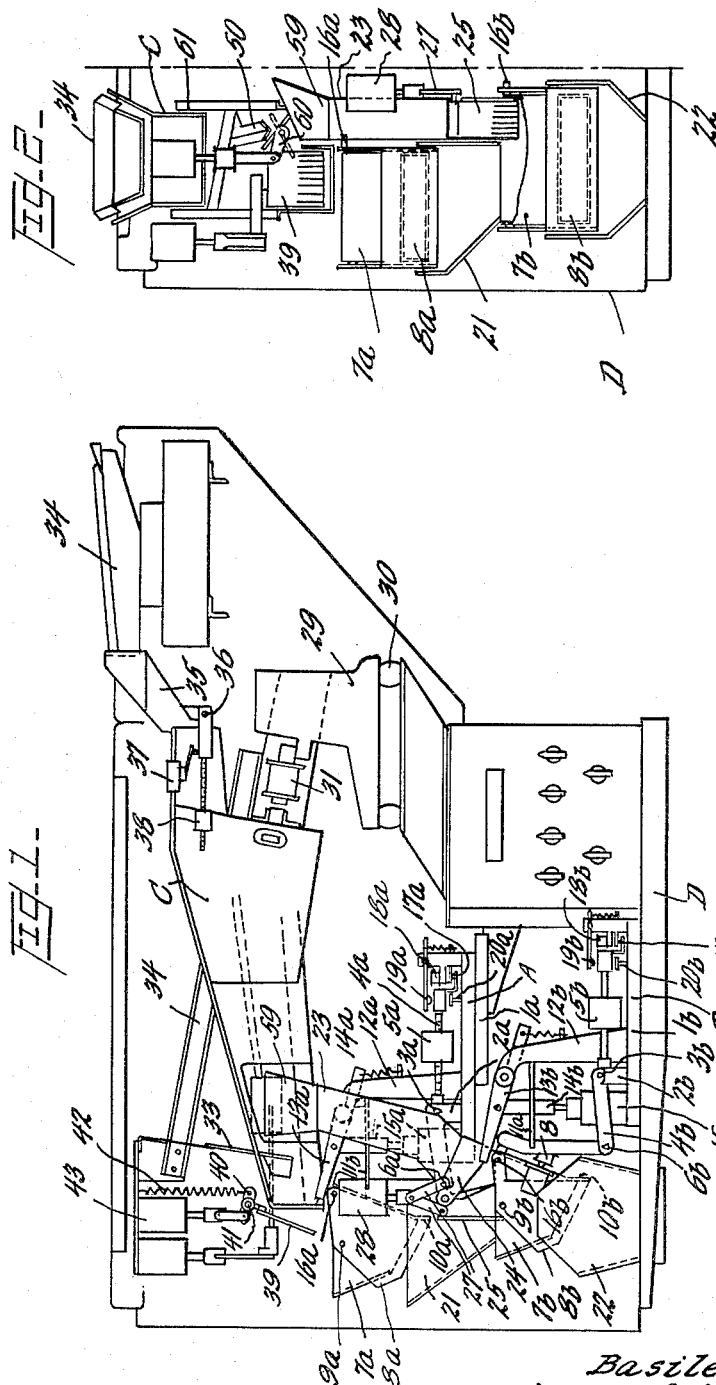

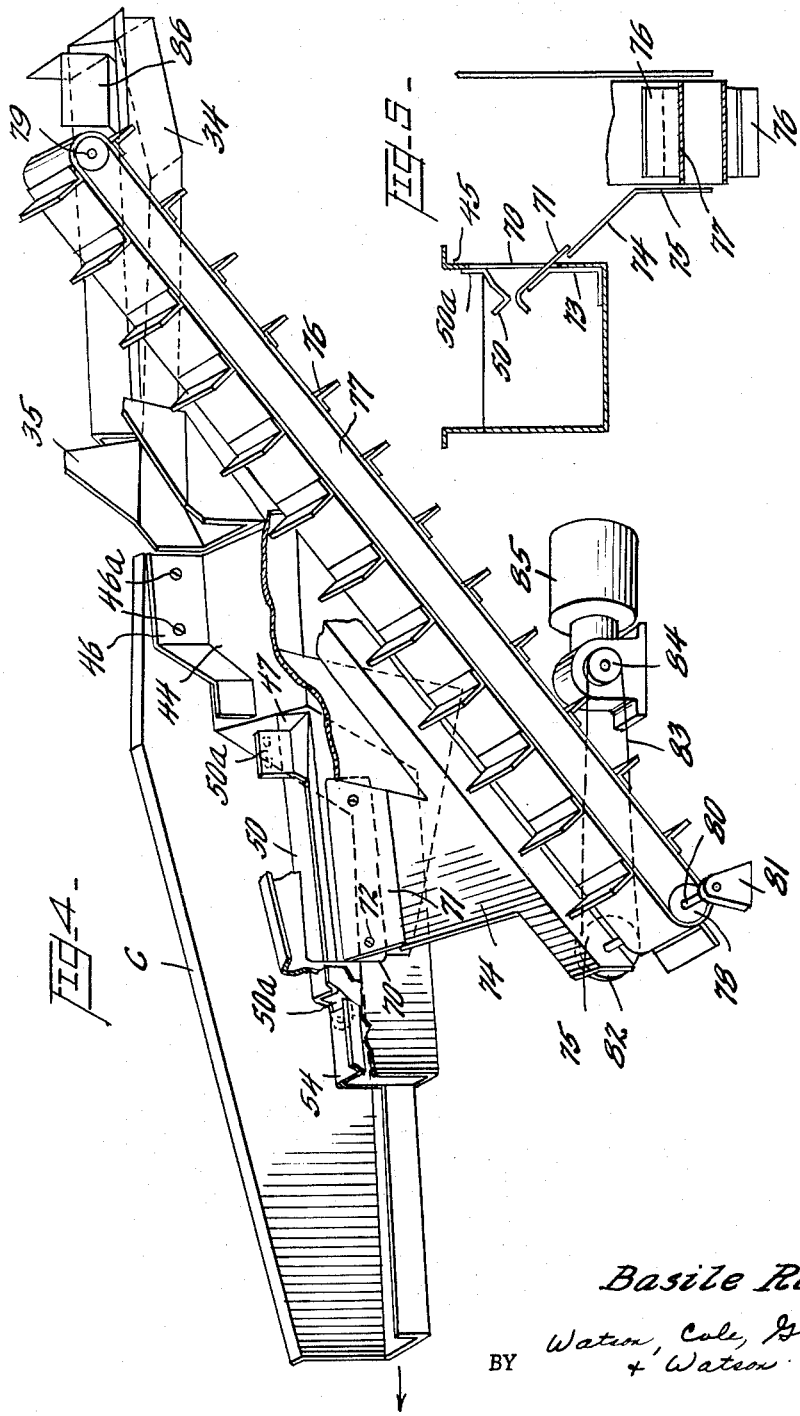

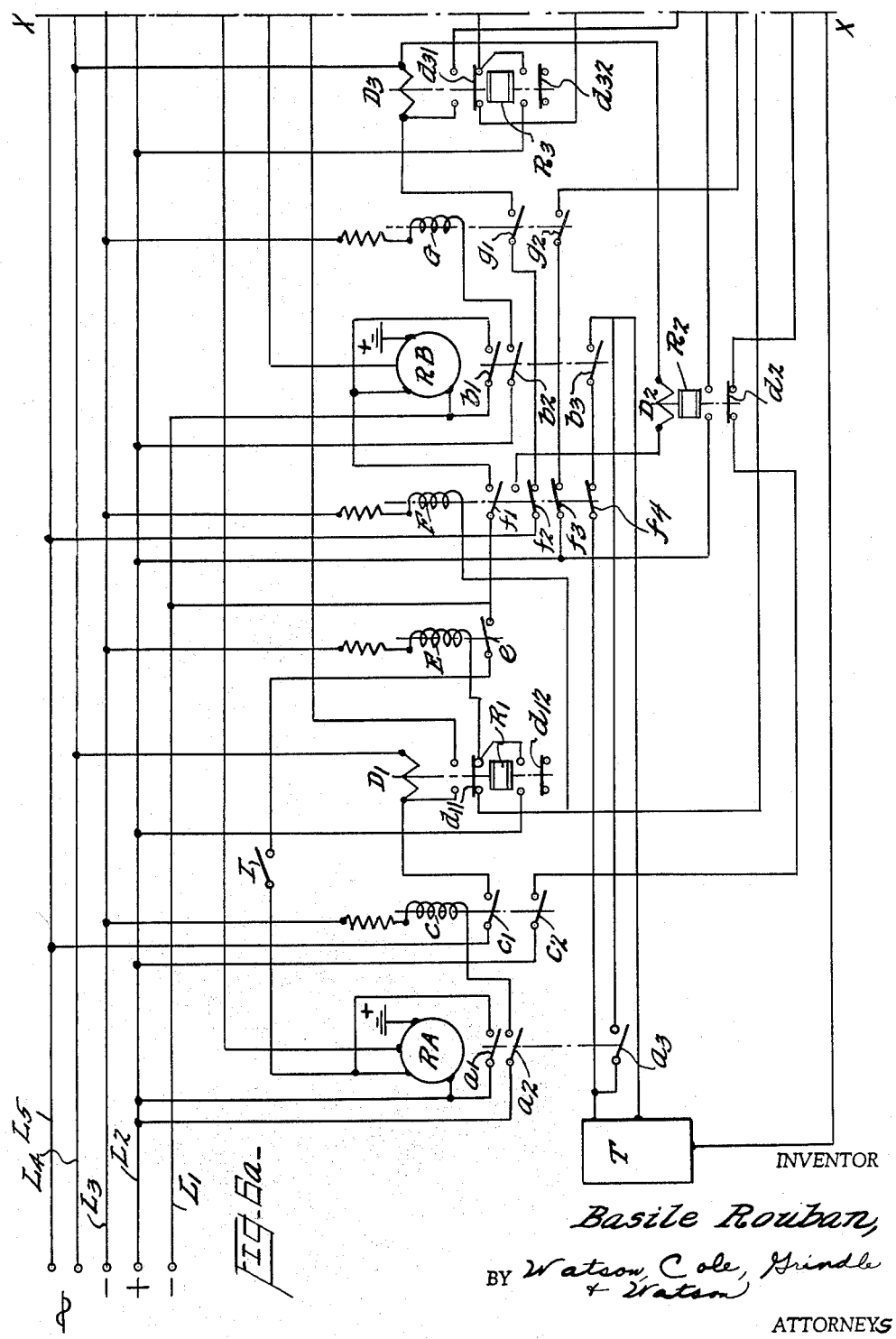
FIG-6a-

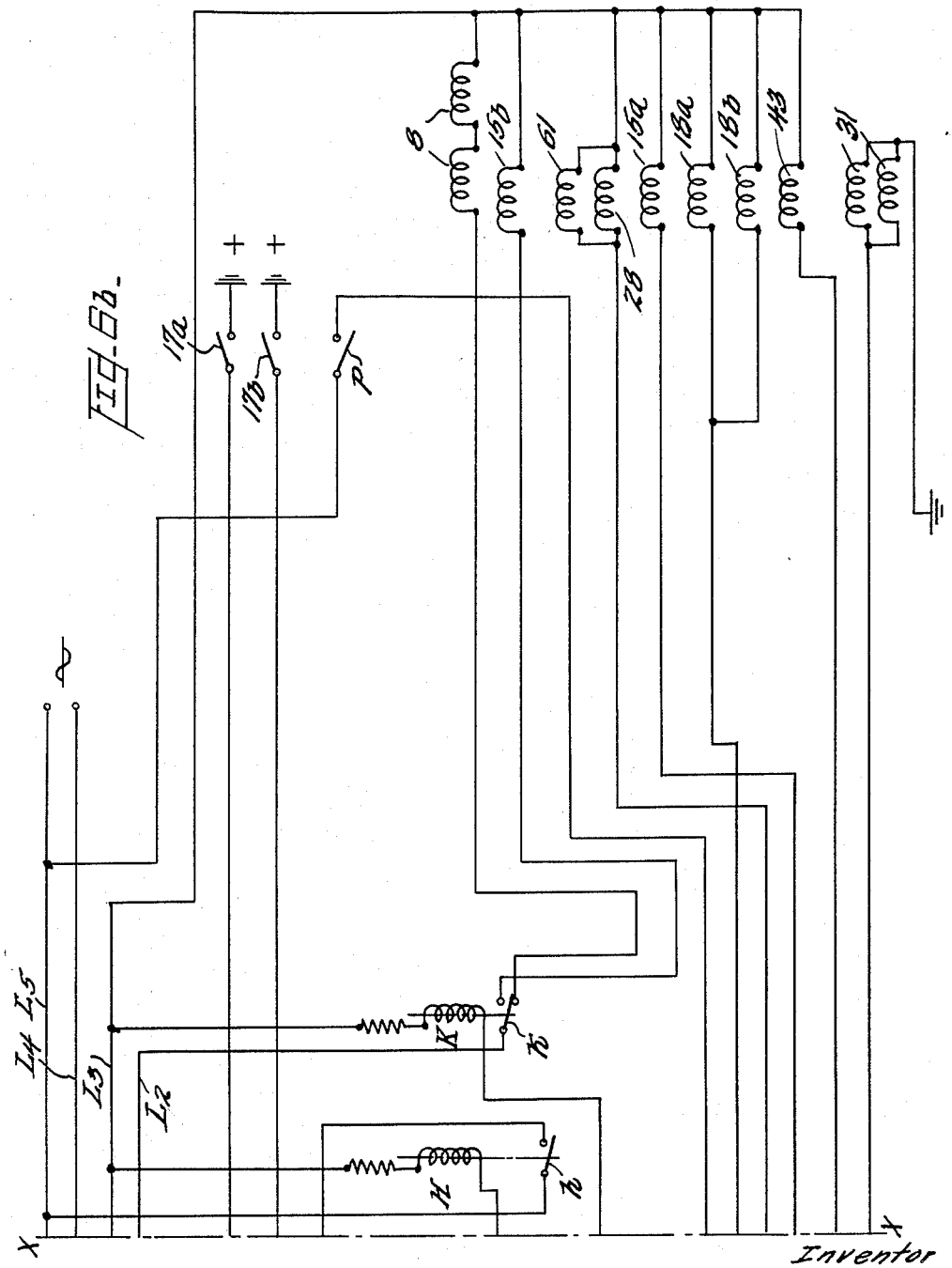

United States Patent Office 3,175,632
Patented Mar. 30, 1965

3,175,632
WEIGHING SYSTEM
Basile Rouban, Clamart, Seine, France, assignor to Trayvou S.A., La Mulatiere, Rhone, France, a company of France
Filed Jan. 14, 1963, Ser. No. 251,267
Claims priority, application France, Jan. 16, 1962, 884,938; Dec. 26, 1962, 919,713
18 Claims. (Cl. 177—64)

This invention relates to weighing or metering systems of the type including a crude weigher device and a fine weigher device cooperating to weigh out accurate doses of a divisible material.

It is frequently desired to meter accurate equal doses of a divisible, e.g. particulate, material, especially for packaging purposes, for example in the fields of the confectionery industry, pharmacy, and the like. It is well-known for such purposes, in order to expedite the metering operations especially in the cases of fully or partly automatic installations, to provide a crude weigher and a fine weigher. The crude weigher is arranged to be supplied with a stream of the material at a relatively high rate and is operated to weigh out a major fraction of the total amount of material desired for each metered quantity. The fine weigher is arranged to have the amount of material weighed in the crude weigher transferred thereto, and is moreover supplied with a stream of material at a considerably lower rate than the crude weigher, so as to terminate accurately the weighing of the total desired metered quantity.

In known metering installations of this kind, the crude weigher is supplied from a store of the material by way of a crude feeder channel of relatively wide cross section, and the fine weigher is supplied from said store through a selector and fine feeder channel of narrow cross section. The selector channel is so constructed that the material, if in particulate form, is fed in a single-file stream of particles. Moreover, means are provided for transferring the amount of material weighed in the crude weigher, into the fine weigher to be weighed therein together with the material fed thereto by way of the narrow feeder channel, and for discharging the total metered amount of material from the fine weigher to an output. Conveniently, the system is arranged for conveying the materials therethrough by gravity, with the crude weigher being positioned below an overhead store of the material, and with the fine weigher being positioned below the crude weigher and being itself positioned above an output collector.

In present systems of this type, loss of time occurs due to the fact that the fine weighing operation may terminate before the crude weighing operation has been completed in which case the feed of material to the fine weigher must be arrested and the total rate of feed to both weighers is thereby correspondingly reduced, leading to loss in production rate. Moreover, the material tends to build up in the selector channel during the idle periods thereof, tending to cause obstructions therein. It is among the important objects of this invention to eliminate these difficulties, and to permit maintaining a continuous stream of materials through the selector channel supplying the fine feeder channel, thereby both increasing the production rate and improving the general operation of the system, as well as the ease of control and adjustment thereof.

This object is generally attained by the provision of means for selectively directing material from the selector channel into the crude weigher.

Other objects of the invention reside in improving the manner of feed of a stream of particulate material over a selector channel in a dual weighing installation of the general type described above, and more specifically to provide means whereby the material will be more positively and reliably conveyed in a single-file stream of particles, by causing any particles in excess of such single-file stream to be pushed out of the fine feeder channel over a side thereof, and delivered into the crude feeder channel and/or to the store.

In connection with this aspect of the invention, it should be observed that the behaviour of divided or particulate materials as they are conveyed through a selector channel depends on the nature of the materials, and experience has shown that in the case of particulate materials having a tendency to catch on to one another, as for example with individually paper-packed candy, or the like, the number of articles dropping out of the selector channel is, on the average, a multiple of the number of articles remaining within the channel and delivered to the fine weigher. Thus, assuming an individual particle or article weighs 5 grams, and that for each article reaching the fine weigher there are six articles dropping out of the selector into the crude feeder channel, and assuming further that the fine weighing operation involves a supply of four or five articles, i.e. 20 or 25 g., into the fine weigher, it is seen that in such a weighing process, the weight of material discharged into the crude feeder channel from the selector or fine weigher channel is six times greater than the normal feed rate through the crude feed channel. Thus, even if the crude feed channel is supplied exclusively with the overflow from the selector or fine feed channel, the minimum rate of feed cannot be reduced to less than about 120 to 150 g. In other words, under the above assumed conditions, the weighing system will not permit of metering doses less than about 150 g.

It is another important object of this invention to reduce the minimum metered dose to which a given dual weighing system can be adjusted and at which it can be effectively operated. This object is achieved, broadly, by the provision of means for collecting at least part of the overflow from the selector channel and directing it elsewhere than into the crude feeder channel, preferably to the store of material or to a point of the feeder system ahead of the feeder channels. The rate of delivery through the crude feeder channel can thus be determined as desired and the lower limit of the range of metered quantities achievable with the system can be reduced to a lower range.

Further objects of the invention are to provide a highly efficient, practical, and economical dual weighing or metering system susceptible of fully or partly automatic, cyclic operation. Yet further objects will appear from the ensuing description of an exemplary embodiment of the improved weighing system, when taken in conjunction with the accompanying drawings, wherein:

FIG. 1 is a general view in side elevation, somewhat schematic, of the system of the invention.

FIG. 2 is a corresponding front elevational view.

FIG. 3 is a perspective view, on an enlarged scale, of the feeder section of the system.

FIG. 4 is a view generally similar to that of FIG. 3, but illustrating a modified form of feeder having provision for returning part of the overflow to an input portion of the feeder section.

FIG. 5 is a transverse cross sectional view corresponding to FIG. 4.

FIGS. 6a and 6b, which are to be regarded as merging on the line X—X, illustrate a diagram of the electrical control circuitry of the system.

In the illustrated embodiment, the weighing system comprises generally a crude weighing section A, a fine weighing section B and a feeder section C for feeding both weighing sections A and B; the three sections A, B and C are supported on a common frame D. Each of the weighing units A and B which are generally similarly constructed, comprises a baseplate 1a or 1b, the baseplate 1a of crude weigher A being mounted on a lower part of the main frame D, while the baseplate 1b of the fine weigher B is mounted on frame D in a position vertically spaced below baseplate 1a.

Each of the weighers A and B further comprises a pair of bearing posts 2a and 2b upstanding from the baseplate 1a or 1b, and a beam 4a or 4b having bearing blades 3a or 3b fulcrumed on bearing posts 2a or 2b. The beam 4a or 4b is extended beyond the end having the bearing posts 3a, 3b by a bar on which a weight 5a, 5b is slidable. The other end of beam 4a, 4b is provided with bearing blades 6a, 6b on which is fulcrumed a hopper 7a, 7b projecting upwardly and outwardly from the weigher structure. The bottom outlet orifice of the hopper has a pivoted closure gate 8a, 8b associated with it. The gates 8a, 8b are pivoted to the hoppers 7a, 7b at 9a, 9b in such a manner as to be urged by their own weight to a closing position, at which they are abutted by stops 10a, 10b, on the hoppers. In addition, the gate 8b associated with the fine weigher is locked in the closing position by an electromagnetic device 8. Each of the hoppers is supported by way of pivotal linkage 11a, 11b from a post 12a and 12b connected through a link 14a, 14b, to an electromagnet 15a, 15b secured to the baseplate 1a, 1b. When the electromagnet is energized it rotates lever 13a, 13b into engagement with a finger 16a, 16b projecting from an extension of the related gate 8a, 8b to move the gate to the open position.

Also associated with the weigher beam 4a or 4b, is a pair of contacts 17a or 17b controlling the energization of an electromagnet 18a, 18b which in turn, when energized, acts on a spring-biassed rocking armature 19a, 19b to block the beam against a stop 20a, 20b secured to the baseplate. The lower part of the hopper 7a associated with the crude weigher A is surrounded by a deflector or collector wall 21, discharging into the top of the hopper 7b, so that on opening of the gate 8a the materials are discharged from the hopper 7a of the crude weigher into the hopper 7b of the fine weigher. In a similar manner the hopper 7b is surrounded by a collector 22 for the discharge of the weighed materials.

Also discharging into the hopper 7b associated with the fine weigher B is a chute or conduit 23 which is provided in its lower end with a dual gating device including a pivoted helmet-shaped member 24 which in the open condition is swung to a retracted position below the conduit as shown in full lines in FIG. 1, and a screen member 25, movable with and relatively to the helmet member 24 and comprising a sheet of flexible material cut into strips. The members 24 and 25 are pivoted to the conduit about a common axis 26 and are operated between their open and closed positions by means of an electromagnet 28 through links 27. The provision of the dual gate means for the conduit 23 is advantageous in that it ensures greatly reduced inertia during opening and closing movements.

The feeding unit C comprises a feeder frame 29 mounted by way of shock-absorbing supports 30 on a side of the main frame D, and carrying a vibrator device 31 and a distributor 32 vibrated thereby and connected through resilient strips 33 to a pair of longitudinal side frame members 34 extending from the feeder frame. The feeder mechanism will be described in greater detail with reference to FIG. 3, but it may here be indicated that the feeder 32 is supplied with material to be weighed from a storage hopper (not shown) provided at its lower end with an extractor device 34 by way of a load detector or metering device 35, comprising a chute pivoted at 36 to a bracket adjustably attached to feeder 32 by way of a screw rod having a balance weight 38 adjustably positioned thereon. When the load of material in the metering chute 35 attains a prescribed value as determined by adjustment of the weight 38, the chute 35 is caused by gravity to rock about its pivot and thereby to actuate contacts 37 connected in series in the energizing circuit controlling the operation of the hopper extractor 34 so as to reduce the rate of discharge of material therethrough. The feeder 32 discharges at a point overlying the hopper 7a associated with the crude weigher A, and is adapted to be sealed by means of a screen 39 made of an element of flexible material cut into strips. The screen member 39 is biased to its closing position by a spring 42 and is actuated to its open position by an electromagnet device 43.

As best shown in FIG. 3, the feeder 32 comprises at its receiving end an inclined plane 44 sloping downwardly both towards the inlet end of the feeder and towards a sidewall 45 (also see FIG. 2). A deflector wall 46 is directed at an angle to the outlet end of incline 44, the angle preferably being adjustable, so as to deliver the materials as indicated by the arrow f towards the sidewall 45.

The receiver incline 44 is followed by a section that is transversely divided into a V-shaped collector recess 47, adjacent the sidewall 45 and a transverse incline 48 leading to a chute 49 feeding the crude weigher, and terminating in the aforementioned sealing screen member or gate 39. The collector recess 47 is extended forwardly by a selector channel 50, also V-shaped in transverse cross section, and so shaped and dimensioned that the materials to be weighed tend to align themselves into a single file or row as they proceed through said channel. Between the selector channel 50 and the side wall 45 is formed a gap or opening 51 below which is positioned an inclined plane 52 serving to return into the crude feeder chute 49 any overflow materials that may be pushed out of the channel 50 over the left hand side of it. The overflow materials dropping over the right side are delivered directly into the chute 49. The selector channel 50 terminates, rearward of the extremity 53 of chute 49, in a small-sized distributor channel 54 also of V-section constituting the fine feeder channel. The channel 50 and receptacle 47 are integrally constructed from a single shaped part secured by way of lugs 50a and screws 50b to the side wall 45 and the base of channel 54. In front of the channel 54, sidewall 45 has an opening 55 into which can pass a rocking deflector member 56 secured to a pivot 57 substantially aligned with the bottom ridge of the channel 54. The rear edge of deflector 56 is adjacent to the front edge of channel 54 and the pivot 57 is rotatable in a bearing 58, so that the deflector 56 can be brought to a first position substantially into alignment with the wall 54a of channel 54 (the full-line position in FIG. 3), in which case the materials discharged from channel 54 are delivered into a funnel 59 provided at the upper end of chute 23 and adjacent to the opening 55, or to a second position substantially in alignment with the opposite side 54b of the channel 54 (chain-line position), in which position the materials are discharged into the crude feeder channel 49. Pivot 57 is connected by way of a lever 60 having a boss secured on said pivot, to the vane of an electromagnet 61 which serves to actuate deflector 56 between its two positions (also see FIGS. 1 and 2).

The electrical control system of the weighing machine shown schematically in FIG. 6, includes a pair of electromagnetic relays RA and RB, respectively connected with the contact pairs 17a and 17b actuated by the weighers A and B, so that said relays are deenergized when the respective contact pairs are closed. Relay RA operates three normally de-energized contact pairs: contacts a1 connected in series with a main switch I serving to start and stop the weighing machine, contacts a2 controlling the energization of a relay C, and contacts a3 connected in the energizing circuit of a thyratron T.

Relay C has two normally deenergized contacts: C1 connected in series with the winding of a relay D1, and C2 connected in series with the electromagnet controlling the crude weighing channel closure gate 39.

Relay D1 is a time relay and controls a first quick-acting pair of contacts d11 and a second, delayed-opening pair of contacts through a time-delay device R1 of any suitable type, e.g. pneumatic.

In its operated condition the contact pair d11 provide energization for the relay D1 by way of contacts h of a relay H. In its idle condition said contact pair d11 permits energization of two relays E and F and electromagnet 15a, provided the contacts d12 are in the operated condition. Relay E has an idle contact pair e connected in series with switch I, and with contacts f1 of relay F connected in the energizing circuit for relay RB.

Relay F further controls three pairs of contacts: f2 adapted in operated condition to apply energization to a time relay D2 and, when idle, apply energization to a third time relay D3 by way of the normally-deenergized contacts g1 of relay G; contacts f3 which in idle condition apply energization to the electromagnets 28 and 61 by way of the normally-deenergized contacts g2 of the relay G; and contacts f4 normally energized, and connected in the energizing circuit for thyratron T.

The time relay D2, provided with adjustable delay means R2, controls a single pair of contacts d2 which, when operated, applies energization to the electromagnets 18a and 18b blocking the beams of the weigher units and, in the idle condition, completes a circuit from the contacts c2 of relay C, to the electromagnet 43 controlling the gate 39 of crude weigher feeding channel 39.

Relay RB has three normally deenergized contact pairs: b1 connected in series with the contacts f1 of relay F; b2 connected in the supply circuit for relay G, and b3 connected in the energizing circuit for thyratron T, in series with f4 but connected in parallel with contacts a3 of relay RA.

The time relay D3 similar to relay D1 has an immediate-acting contact pair d31 and a delayed-opening contact pair d32, including the delay device R3. Contacts d31, in operated condition, apply energization to the relay D3 by way of a switch p operable by means of a pedal or other control. In the idle condition contacts d31 apply energization to relay H and relay K, provided the contact pair d32 is in operated condition. Relay K controls a contact pair k which when idle applies energization to electromagnet 8 and, when operated applies energization to electromagnet 15b.

Relays RA and RB are supplied with relatively low D.-C. voltage, e.g. 24 volts, from a line L1, connected to the negative supply terminal, and through ground to positive terminal. Relays C, E, F, G, H and K are supplied with a higher D.-C. voltage, e.g. 170 volts, through lines L2 and L3. Delayed-action relays D1, D2 and D3 are supplied with A.-C. voltage, e.g. 220 volts, through lines L4 and L5.

The operation of the system will now be described, it being assumed that a weighing operation has just been completed and that the hoppers 7a and 7b of both weighers A and B are filled with respective quantities of the material to be weighed.

The contact pairs 17a and 17b are both closed, and the main switch I is, of course, closed also. Relays RA and RB are deenergized. Vibrator device 31 is inoperative. Relay C is deenergized and electromagnet 43 is hence also deenergized. The gate of the crude weigher feed channel is in closed position. Relay D3 is energized owing to the closure of pedal-controlled switch p. Relays H and K are deenergized and hence relay D1 and electromagnet 15b are all deenergized, while the electromagnet 8 is energized, so that the outlet gate 8b of hopper 7b is in opened position.

Since relay D1 is deenergized, electromagnet 15a is deenergized, so that the gate 8a at the outlet of hopper 7a is closed. Relays E and F, and relays D3 and G, are also deenergized. Electromagnets 28 and 61 as well as electromagnets 18a and 18b are deenergized.

To initiate an operating cycle, switch p is momentarily opened. This deenergizes relay D3, so that its contacts d31 are moved to their idle condition, while contacts d32 remain in the operated condition for a time determined by delay device R3. Relay K is energized and its contacts k are moved to their operated condition, energizing the fine-weigher electromagnet 15b and deenergizing blocking electromagnet 8. The gate 8b of hopper 7b is thereby opened, and the metered amount of materials is discharged into the channel 22.

Simultaneously, energization of relay H energizes the time relay D1.

On opening of the contacts d32, relay K is deenergized. Electromagnet 15b is deenergized while electromagnet 8 is energized. Gate 8b is moved back to its closed position and is blocked in that position.

The opening of contacts d32 also deenergizes the relay H and therefore relay D1 which causes electromagnet 15a of the hopper 7a to be energized for a time determined by adjustment of the delay device R1 and hence opens the gate 8a of said hopper for a corresponding period of time, so that the contents is transferred by gravity into the fine weigher hopper 7b. Simultaneously, deenergization of relay D1 causes deenergization of relay F for the afore-mentioned period of time; relay F operates contacts f1 to energize relay RB and operates contacts f2 to energize relay D2, which acts to energize the electromagnets 18a and 18b blocking the balance beams of both weighers to prevent them from swinging under the impact caused by the closure of the related hoppers and the discharge into hopper 7b of the materials previously contained in hopper 7a.

The return of contacts d12 to idle condition disconnects the circuit for relay F, so that its normally closed pair of contacts f2 energizes relay G. Relay G operates its contacts g2 connected in series with f3, to energize electromagnets 28 and 61. Electromagnet 28 opens the dual gates 24, 25 of chute 23, while electromagnet 61 moves deflector flap 56 to the position shown in full lines in FIG. 3, to cause the materials to drop from channel 54 into channel 23 and thence into the hopper 7b of the fine weigher B.

Return of switches d12 to idle condition also disconnects the circuit for relay E, so that its normally closed contacts e, in series with the closed switch I, energizes relay RA.

The delayed return of contacts d2 to idle condition releases the beams of both weighers, and energization of the electromagnet 43 lifts the gate 39 of the crude weigher feeder channel.

Relays RA and RB operate their respective contacts a3 and b3, thereby energizing thyratron T, to energize in turn the vibrator 31.

The materials then drop into the hoppers of the respective weighers; through the crude feeder channel 49 into the hopper 7a of the crude weigher device A, and through the fine feeder channel 54, in single file, and through chute 23 into the hopper 7b of the fine weigher device B.

When the amount of materials discharged into one of the weigher hoppers has reached the value necessary to restore the balance, the contacts 17a or 17b of the associated weigher are closed. Closure of contacts 17a deenergizes relay RA and hence relay C, to deenergize electromagnet 43, whereupon the outlet gate 39 of the crude weighter chute is moved to closing position. Closure of contacts 17b deenergizes relay RB which deenergizes the relay G, thereby disabling the circuit for the electromagnet 28 to move the gate 24–25 of chute 23 to closing position, and also deenergizes electromagnet 61, so that the gate 56 returns to its idle position, shown in chain lines in FIG. 3. It is only after both contact pairs 17a and 17b have been closed and both relays RA and RB consequently deenergized, that the weighing operation is completed, whereupon the thyratron T, which is deenergized, stops the operation of vibrator 31.

Should contacts 17b close before contacts 17a, that is, should the fine weighing operation be completed before the crude weighing operation, the materials from selector channel 50 and chute 54 are directed by deflector 56 towards the main supply flow in channel chute 49 and hence into the crude weigher, so that the crude weighing process is accelerated. If on the other hand contacts 17a close first, the slow-rate supply flow for the fine weigher continues until closure of contacts 17b, since vibrator 31 is maintained in operation and gate 56 remains in its normal position shown in full lines. After closure of both contact pairs 17a and 17b, the weighing process is terminated, the components of the weighing system have been restored to their initial positions and a fresh weighing cycle can be initiated by action on switch p.

In a modified embodiment of the invention shown in FIGS. 4 and 5, the general arrangement is similar to that first described, including the feeder section C supplied with materials to be weighed from the hopper extractor 34 by way of load senser 35, and delivering the materials on to the receiver incline 44 provided with a deflector wall 46 removably mounted by way of screws 46a so as to permit replacement when desired, e.g. depending on the nature of the materials to be weighed.

The selector channel 50 and the associated input receiver recess 47 are secured to the wall 45 of the feeder and to the fine feeder channel 54, by means of lugs 50a and screws, whereby these components also may be replaced when required by the nature of the materials being handled. The wall 45 is formed with an aperture 70 in its side directed into the selector channel 50, and a deflector 71 is movable in said aperture, the deflector being secured by screws 72 to a bracket 73 secured to the feeder, as shown in FIG. 5. In the example shown, deflector 71 is roof-shaped, its ridge being positioned vertically beneath the ridge of the V-shaped channel 50, so that any materials overflowing from the left side of the channel (as seen in the direction of flow of the materials) will be directed out of the feeder. Clearly other forms of deflector may be conceived for intercepting a greater or smaller portion of the materials dropping out of the channel. Underlying the outer slope of deflector 71 is an inclined plane 74 connected to the side flange 75 of a conveyor 76.

Conveyor 76 comprises an endless belt 77 with vanes thereon, trained around a lower drive pulley 78 and an upper idler pulley 79. The drive pulley 78 is mounted on a shaft 80 mounted in bearings 81 on the main frame, and said shaft carries a further pulley 82 coupled by a drive belt 83 with a pulley 84 secured on the output shaft of a motor-reducer unit 85. The idler pulley 79 is mounted between the side flanges 75 and 75a of the conveyor (the flanges are only partly shown for clarity) and overlies a chute 86 by which the materials dropping over the top of the conveyor belt are delivered into the hopper extractor 34.

It will thus be seen that in the embodiment last described, the invention makes it possible to withdraw a selected proportion of the stream of materials dropping off the selector channel and return them to a point ahead or upstream of the feeder. Thus, by suitably selecting the deflector wall 46 and the flap 71, the rate of flow of materials through the crude weigher feed channel can be reduced with respect to the rate of flow through the fine weigher feed channel and it is accordingly possible to decrease the value of the minimum metered load the machine is capable of weighing.

It will be evident that various modifications of the invention may be conceived other than the embodiments illustrated and described, without exceeding the scope of the invention as defined by the appended claims.

What I claim is:

1. A weighing system comprising a crude weigher; a fine weigher; first means for feeding material to be weighed from a store thereof at a first rate to said crude weigher to be weighed therein; means for transferring an amount of material as weighed in said crude weigher to said fine weigher; second feeding means for feeding material from said store at a second and lower rate; reflector means selectively operable to either one of two positions in a first one of which material from said second feeding means is directed to said fine weigher to be weighed therein together with said transferred amount, and in the second one of which material from said second feeding means is directed to said first feeding means; and means for discharging an amount of material as weighed by said fine weigher to an output.

2. A weighing system comprising a crude weigher; a fine weigher positioned below said crude weigher; first conduit means connected to a store of material to be weighed and to said crude weigher for feeding said material at a first rate to said crude weigher to be weighed therein; means for transferring an amount of material as weighed in said crude weigher by gravity to said fine weigher; second conduit means adjacent to but separate from said first conduit means for feeding material from said store at a second and lower rate; passage means connecting said second conduit means to said fine weigher and to said first conduit means respectively; gate means associated with said passage means and selectively operable to either one of two positions for feeding material at said slow rate to said fine weigher and to said first conduit means respectively; and means for discharging an amount of material as weighed by said fine weigher to an output.

3. The system claimed in claim 2, wherein said passage means comprises a downgoing conduit extending from an outlet end of said second conduit to said fine weigher, and said gate means comprises a single pivoted gate member pivotable between a first position wherein the communication from said outlet end to said downgoing conduit is open, and a second position wherein said communication is closed and said gate member directs material from said outlet end laterally into said adjacent first conduit.

4. A weighing system comprising a store of material to be weighed; a crude weigher; a fine weigher positioned below said crude weigher; material-conducting means connected to said store and including two branch channels of wider and narrower cross section respectively; means connecting said wider channel to said crude weigher for feeding material thereto to be weighed therein; means connecting said narrower channel to said fine weigher for feeding material thereto to be weighed therein; gravity means for discharging an amount of material as weighed in said crude weigher into said fine weigher to be weighed therein together with material fed thereto over said narrower channel; gate means operable between a retracted position and another position in which said gate means cuts off said second-mentioned connecting means to prevent material from passing from said narrower channel into said fine weigher and deflects said material into said wider channel; and gravity means for discharging an amount of material as weighed by said fine weigher to an output.

5. The system claimed in claim 4, wherein said material is particulate, and said narrower channel is shaped and dimensioned to conduct said material as a stream of single particles.

6. The system claimed in claim 4, wherein said material-conducting means comprises an inclined plane sloping down longitudinally away from said store and transversely towards one side, and said narrower channel extends from said one side of said plane and said wider channel extends from the other side of said plane; and a collecting recess interposed between said one side of said plane and said narrower channel.

7. A weighing system comprising a store of particulate material to be weighed; a crude weigher below said store; a fine weigher below said crude weigher; material-conducting means connecting with said store and each of said weighers for feeding said material by gravity at a higher rate to the crude weigher and at a lower rate to the fine weigher; further material-conducting means connecting said weighers to feed material weighed in the crude weigher, to said fine weigher by gravity; and means for discharging material from said fine weigher to an output; wherein said first material conducting means comprises an inclined plane sloping down longitudinally away from said store and transversely to one side of said plane; a wider channel extending from the lower end of said plane at the opposite side of said plane and leading to said crude weigher; a V-shaped collector recess connecting with the lower end of said plane at said one end thereof; a V-shaped selector channel of narrower cross section extending from said recess and leading to said fine weigher; said selector channel being so shaped and dimensioned that said material is conducted from said recess through said selector channel as a stream of single particles, while particles in excess of said stream overflow over a side of said narrower channel and means for conducting the overflow particles by gravity into said wider channel and gate means comprising a deflecting member selectively operable to two positions respectively to deliver materials from said V-shaped selector channel of narrower cross-section into said fine weigher in one position and to deliver materials into said material conducting means for the crude weigher in the other position.

8. The system claimed in claim 7, including a deflector wall bounding said other side of said inclined plane and directed at an angle towards said one side thereof.

9. The system claimed in claim 7, including means for conducting by gravity excess particles overflowing over both sides of said selector channel into said wider channel.

10. The system claimed in claim 7, including means for conducting a selected part of the overflowing particles back to a point of said material-conducting means ahead of said selector channel.

11. The system claimed in claim 7, including means for collecting excess particles overflowing over the opposite side of said selector channel and elevator means for returning the collected particles to a point of said material-conducting means ahead of said selector channel.

12. A weighing system comprising a crude weigher; a fine weigher; first feeding means connected to a store of material to be weighed and to said crude weigher for feeding said material at a first rate to said crude weigher to be weighed therein; means for transferring an amount of material as weighed by said crude weigher to said fine weigher; second feeding means connected to said store and to said fine weigher for feeding material at a second and lower rate from said store to said fine weigher to be weighed therein together with said amount transferred from said crude weigher; means for discharging the total amount of material weighed in said fine weigher to an output; movable deflector means selectively operable to one position for directing material from said second feeding means into said first feeding means; and means responsive to the attainment of a balance condition by said fine weigher for operating said deflector means to said position.

13. The system claimed in claim 12, including gate means operable to a position for cutting off the feed of material from said first feeding means to said crude weigher, and means responsive to the attainment of a balance condition by said crude weigher for operating said gate means to said cut-off position.

14. A cyclically operable weighing system comprising a store of material to be weighed; a crude weigher; a fine weigher; first and second feeding means connecting said store with said crude and said fine weighers respectively for feeding material to said weighers at a higher and a lower rate respectively; distributor means selectively operable for initiating the feed of material over both said feeding means to said weighers and for terminating said feed; means for transferring an amount of material as weighed by said crude weigher into said fine weigher to be weighed therein together with the material fed thereto over said second feeding means; means for discharging the total amount of material weighed in said fine weigher to an output; deflector means selectively operable to a position for directing material from said second feeding means into said first feeding means; first sensing means actuated on attainment of a balance condition by said fine weigher; second sensing means actuated on attainment of a balance condition by said crude weigher; means responsive to actuation of said first sensing means for operating said deflector means to said position; and means responsive to the actuation of both said sensing means for operating said distributor means to terminate the feed of material to said weighers.

15. The system claimed in claim 14, including gate means operable to a position for cutting off the feed of material from said first feeding means to said crude weigher, and means responsive to the actuation of said second sensing means for operating said gate means to said position.

16. The system claimed in claim 14, including further sensing means actuated on discharge of said total amount of material from said fine weigher to said output, and means responsive to actuation of said further sensing means for operating said distributor means to initiate the feed of material to both weighers.

17. The system claimed in claim 14, including gate means operable to a position for cutting off the feed of material from said first feeding means to said crude weigher, means responsive to the actuation of said second sensing means; means for operating said gate means to said position; further sensing means actuated on discharge of said total amount of material from said fine weigher to said output, and means responsive to actuation of said further sensing means for operating said distributor means to initiate the feed of material to both weighers, wherein said sensing means comprise electrical contacts, and electrical power means in circuit with said contacts for cyclically operating said system.

18. The system claimed in claim 14, including means responsive to the actuating of said first and said second sensing means for blocking the operation of said fine and crude weighers respectively.

References Cited by the Examiner

UNITED STATES PATENTS

| 2,076,640 | 4/37 | Howard et al. | 177—57 |
| 2,258,182 | 10/41 | Howard | 177—120 |
| 2,726,061 | 12/55 | Schieser et al. | 177—48 |
| 2,904,304 | 9/59 | Zwoyer | 177—119 X |
| 3,076,516 | 2/63 | Rouban | 177—122 X |
| 3,094,182 | 6/63 | Garnett et al. | 177—1 |

FOREIGN PATENTS 11,046   5/10   Great Britain.

LEO SMILOW, *Primary Examiner.*